United States Patent
Eberhardt et al.

(10) Patent No.: US 10,851,495 B2
(45) Date of Patent: *Dec. 1, 2020

(54) CLOTHING FOR A MACHINE FOR PRODUCING A FIBROUS WEB

(71) Applicant: VOITH PATENT GMBH, Heidenheim (DE)

(72) Inventors: Robert Eberhardt, Ellwangen (DE); Siegfried Graser, Niederstotzingen (DE); Matthias Schmitt, Munich (DE)

(73) Assignee: Voith Patent GmbH, Heidenheim (DE)

( * ) Notice: Subject to any disclaimer, the term of this patent is extended or adjusted under 35 U.S.C. 154(b) by 159 days.

This patent is subject to a terminal disclaimer.

(21) Appl. No.: 16/093,838

(22) PCT Filed: Apr. 10, 2017

(86) PCT No.: PCT/EP2017/058495
§ 371 (c)(1),
(2) Date: Oct. 15, 2018

(87) PCT Pub. No.: WO2017/178403
PCT Pub. Date: Oct. 19, 2017

(65) Prior Publication Data
US 2019/0112760 A1    Apr. 18, 2019

(30) Foreign Application Priority Data
Apr. 15, 2016   (DE) .......................... 10 2016 206 385

(51) Int. Cl.
*D21F 1/00* (2006.01)
*D21F 7/08* (2006.01)
(Continued)

(52) U.S. Cl.
CPC ............ *D21F 1/0036* (2013.01); *D21F 7/083* (2013.01); *B32B 5/024* (2013.01); *B32B 5/18* (2013.01);
(Continued)

(58) Field of Classification Search
CPC . D21F 7/08; D21F 7/083; D21F 7/086; D21F 7/12; D21F 1/0027; D21F 1/0036;
(Continued)

(56) References Cited

U.S. PATENT DOCUMENTS 3,175,025 A * 3/1965 Geen .......................... C08J 9/38
264/80
3,421,230 A    1/1969 Ward
(Continued)

FOREIGN PATENT DOCUMENTS

DE    102006055828 A1    5/2008
DE    102013218465 A1    3/2015
(Continued)

*Primary Examiner* — Eric Hug
(74) *Attorney, Agent, or Firm* — Lauren A. Greenberg; Werner H. Stemer; Ralph E. Locher

(57) ABSTRACT

A clothing, in particular a forming belt for a machine for producing or processing a fibrous web, includes a paper side, a backing side, a basic structure and at least one further structure. The at least one further structure is formed of or includes a layer of polymer foam providing the paper side of the clothing. A method for producing the clothing is also provided.

17 Claims, 1 Drawing Sheet

(51) Int. Cl.
  *B32B 5/18*  (2006.01)
  *B32B 5/24*  (2006.01)
  *B32B 5/02*  (2006.01)
  *B32B 27/06*  (2006.01)
  *B32B 27/12*  (2006.01)
  *B32B 27/40*  (2006.01)

(52) U.S. Cl.
  CPC ............ *B32B 5/245* (2013.01); *B32B 27/065* (2013.01); *B32B 27/12* (2013.01); *B32B 27/40* (2013.01); *B32B 2307/72* (2013.01); *B32B 2307/726* (2013.01); *B32B 2413/00* (2013.01)

(58) Field of Classification Search
  CPC ......... D21F 1/0063; B32B 5/245; B32B 5/18; B32B 5/26; B32B 5/32
  USPC ..... 162/348, 358.2, 900, 902, 903; 442/221, 442/223, 224, 225, 370, 372, 373
  See application file for complete search history.

(56) References Cited

U.S. PATENT DOCUMENTS

| | | | | |
|---|---|---|---|---|
| 3,617,442 | A * | 11/1971 | Hurschman | D21F 1/0063 162/212 |
| 4,271,222 | A * | 6/1981 | Hahn | D21F 1/0063 162/900 |
| 4,369,081 | A * | 1/1983 | Curry | B32B 27/12 156/148 |
| 4,701,368 | A * | 10/1987 | Kiuchi | B32B 27/12 442/226 |
| 4,830,905 | A * | 5/1989 | Gulya | B32B 5/06 442/326 |
| 4,851,281 | A * | 7/1989 | Wood | B32B 5/24 442/225 |
| 4,931,010 | A * | 6/1990 | Barnewall | D21F 7/083 162/900 |
| 5,118,557 | A * | 6/1992 | Barnewall | D21F 7/083 442/223 |
| 5,232,768 | A * | 8/1993 | Eklund | D21F 7/083 139/383 A |
| 7,156,956 | B2 * | 1/2007 | FitzPatrick | D21F 3/0227 162/358.4 |
| 9,556,559 | B2 | 1/2017 | Boeck | |
| 9,982,388 | B2 * | 5/2018 | Wich | D21F 1/0036 |
| 2001/0032712 | A1 * | 10/2001 | Friedbauer | D21F 11/006 162/109 |
| 2004/0118546 | A1 * | 6/2004 | Bakken | D21F 1/0054 162/348 |
| 2006/0175032 | A1 * | 8/2006 | Ouchi | D21F 7/083 162/358.2 |
| 2008/0216980 | A1 * | 9/2008 | Malmqvist | B32B 3/26 162/287 |
| 2009/0286438 | A1 * | 11/2009 | Kockritz | D21G 1/0066 442/62 |
| 2011/0272112 | A1 * | 11/2011 | Aberg | D21F 1/0027 162/289 |
| 2017/0239912 | A1 * | 8/2017 | Eberhardt | B32B 5/18 |

FOREIGN PATENT DOCUMENTS

| | | |
|---|---|---|
| DE | 102013224678 A1 | 3/2015 |
| DE | 102014212306 A1 | 12/2015 |
| WO | 8807929 A1 | 10/1988 |
| WO | 2010030298 A1 | 3/2010 |
| WO | 2015185278 A1 | 12/2015 |
| WO | 2016058972 A1 | 4/2016 |
| WO | WO 2016/058972 * 4/2016 ............ D21F 7/083 |

\* cited by examiner

CLOTHING FOR A MACHINE FOR PRODUCING A FIBROUS WEB

BACKGROUND OF THE INVENTION

Field of the Invention

The present invention relates to a clothing, in particular a forming belt for a machine for producing or processing a fibrous web, the clothing including a paper side, a backing side, a basic structure and at least one further structure. The invention also relates to a method for producing a clothing, which includes providing a basic structure, providing a further structure and connecting the further structure to the basic structure.

In the production of fibrous webs, especially in the production of paper webs, an aqueous fibrous suspension is usually dewatered on a forming screen or also between two forming screens in the so-called former, and thereafter further dried by pressing and thermal drying. Woven screens from a polymer material are almost exclusively used nowadays for the dewatering in the former. The design of such woven fabrics is usually constructed such that the paper-contacting side has a fine structure, whereas the structure on the backing side, which also provides the wear volume of this screen, has a rough structure, optionally also having thicker threads.

A rich prior art is known for screens of this type. DE 10 2014 212 306 or DE 10 2013 218 465 are to be stated here as examples. However, it is a common feature of all these woven forming screens that the structures thus generated by the weaving pattern have a high uniformity in the structures thereof. These uniformities, despite an optimized design of the woven fabric, can either be embossed in the paper produced, or be precipitated as hydraulic marks. Said uniformities, by virtue of the uniformity thereof, are perceived to a higher degree by the human eye. Screen marks of this type, above all in the case of graphic paper, represent a significant defect in terms of quality of the produced paper.

As an alternative to woven structures, polymer films which are rendered permeable by means of punching or laser perforating have been discussed more recently, for example in DE 10 2013 224 678 or WO 2015/185278. However, the hole pattern created here also has a high uniformity since a purely stochastic pattern, if at all, can only be implemented by way of an extremely high complexity using the punching or laser-perforating methods available today, on account of which such a method cannot be used economically. Apart therefrom, the acquisition of a laser perforating installation, for example, which is suitable for films of the dimension required here also represents an investment which is not insignificant to the producer of paper machine clothings. The existing machinery, in particular the usually existing weaving looms, can no longer be used for film clothings of this type.

A further disadvantage of the existing forming belts, especially of the forming screens, is the fact that a certain quantity of water accumulates in the volumes of said forming belts, said quantity of water potentially making its way back into the paper web. For example, when passing a suction box, part of the quantity of water extracted from the sheet remains in the screen structure. Part of said water makes its way back into the paper web after passing the suction box. On account of this effect which is known as re-humidifying or re-wetting, the dry content of the paper web can be increased by several percentage points, this significantly reducing the dewatering effect that can be achieved by such a suction box.

SUMMARY OF THE INVENTION

The object of the invention lies in providing a clothing as well as a method for the production thereof, which improve or overcome, respectively, the disadvantages of the prior art in terms of the tendency toward marking.

This achievement in terms of the clothing is fully achieved by a clothing for a machine for producing or processing a fibrous web, and in terms of the method is fully achieved by a method for producing a clothing, as described below.

The invention comprises a clothing, in particular a forming belt for a machine for producing or processing a fibrous web. The clothing has a paper side which comes into contact with the paper web, as well as a backing side which is in contact with guiding and dewatering elements such as, for example, guide rollers and/or suction boxes. The clothing herein comprises a basic structure and at least one further structure. It is provided according to the invention that the at least one further structure is composed of or comprises a layer of polymer foam. Said layer of polymer foam herein provides the paper side of the clothing.

Such a layer of polymer foam on account of the pore structure thereof is permeable such that the water from the paper web can flow through said layer of polymer foam. However, the pores are distributed largely in a stochastic manner. On account thereof, neither can uniform patterns be embossed into the paper surface nor can uniform hydraulic patterns be created in the dewatering of the paper web.

While such a clothing in many applications is composed only of the basic structure and one layer of polymer foam, according to the invention however also even further components are possible. In particular, it can be advantageous for yet a two or even third layer of polymer foam to be provided, which can be disposed between the basic structure and the at least one further structure, for example.

In further advantageous embodiments it can be provided that in each case at least one layer of polymer foam is provided on both sides of the basic structure, thus in the direction of the fibrous web and in the direction of the machine.

In other advantageous embodiments it can be provided that one or a plurality of layers of polymer foam are provided only on one side of the basic structure, specifically in the direction of the paper web.

Further advantageous embodiments of the invention are described in the dependent claims.

It can thus be provided that the at least one layer of polymer foam has an anisotropic pore structure. In the case of such an anisotropic structure the shape of at least a large proportion (often more than 50%, or else more than 80%) of the individual pores deviates from the isotropic spherical shape. It can thus be provided in one advantageous embodiment that the pores in the machine direction of the clothing and in the cross direction of the clothing have a larger extent than in the thickness direction. A pore structure of this type can be achieved, for example, by compressing a foam layer having an isotropic pore structure. The water can often be directed rapidly away from the paper web through such an anisotropic pore structure in the direction of the basic structure. As a result, the foam layer usually also has a smaller available storage volume.

In one further very advantageous embodiment of the invention the at least one layer of polymer foam has a noticeable compression capability. It can thus be provided, for example, that in a compressive stressing of the clothing of 50 kPa the layer of polymer foam in the thickness direction is compressed by more than 10%, preferably by more than 15%, particularly preferably by more than 20%, as compared to an initial thickness at a compressive stress of 6 kPa. A layer of polymer foam that is embodied in such a manner can be advantageous for the use of the clothing. Specifically, if such a clothing conjointly with a paper web deposited thereof, and optionally even one further clothing, is guided by way of a suction box, on account of the suction effect of the suction box on the paper web a pressure is exerted on the layer of polymer foam, on account of which said layer is compressed according to this advantageous embodiment. The 6 kPa stated are intended to represent a typical basic stress which acts on the clothing also without the effect of the suction box, for example caused by the weight of the wet paper web, etc. In one particularly preferred embodiment of the clothing the layer of polymer foam is embodied such that in a subsequent compressive de-stressing of the clothing from 50 kPa to 6 kPa the layer of polymer foam expands back to substantially the initial thickness thereof.

In particular advantageous embodiments of the clothing the combination of the compression by way of the suction box and the subsequent expansion after the suction box can lead to the dry content of the material web being increased and the re-wetting described at the outset being significantly reduced. This effect could surprisingly be observed in experiments of the applicant. In this case, the water on account of the compression of the foam layer by way of the suction box can be discharged more rapidly by virtue of the shortened dewatering path. Moreover, on account of the expansion of the foam layer after the suction box the water that is located in the pores and the basic structure can only make its way back into the material web with impediments. These two effects, individually or in combination, can lead to a significant increase of the dry content of the material web.

In one further advantageous embodiment the layer of polymer foam can be composed of or comprise an elastomer, in particular a polyurethane. In particular, a so-called polyurethane soft foam, and herein preferably a reticulated polyurethane soft foam, can thus be used. However, according to the invention, other materials such as, for example, silicone, polyester, polyether, etc., can also be used for the layer of polymer foam.

In preferred embodiments the layer of polymer foam can have an area weight between 60 $g/m^2$ and 300 $g/m^2$.

In further preferred embodiments the layer of polymer foam can have a raw density between 100 $kg/m^3$ and 700 $kg/m^3$.

The basic structure of the clothing can advantageously comprise or be composed of a woven fabric, a cross-laid structure, or a permeable film structure.

The use of a woven fabric as the basic structure can be particularly advantageous. Indeed, the producer of classic forming screens often already has available machinery in the form of suitable weaving looms. In this case, the clothing according to the invention can be produced in a comparatively simple manner while using the existing machinery in the form of weaving looms.

The basic structure can advantageously have a permeability of more than 250 cfm, in particular more than 500 cfm.

The clothing can particularly advantageously have a permeability between 100 cfm and 700 cfm, in particular between 200 cfm and 600 cfm.

The basic structures like the entire clothing are advantageously permeable to water and to gas. However, the determination of permeability by way of the perfusion by means of air has been established for characterizing the permeability. The unit cfm (=cubic feet per minute) herein is the usual unit for evaluating the permeability of clothings. 100 cfm herein correspond to approximately 0.0472 $m^3/s$.

In the clothing according to the invention it is particularly advantageous that the permeability of the clothing in large parts can be controlled by way of the permeability of the layer of polymer foam. Since the permeability of the foam layer in turn can be varied in a comparatively simple manner, for example by compacting, it is possible for clothings according to the invention across a wide range of applications to also be produced from a few standardized initial elements (basic structures, standard foam layers).

In one further advantageous embodiment of the clothing it can be provided that a structure, in particular however not exclusively a uniform structure, is incorporated in the layer of polymer foam. For example, said structure can be embossed into the polymer foam. While the undesirable uniform marks (screen marks, for example) are suppressed by a clothing according to the invention, it can however be desirable in many applications for special structures or symbols to be transferred in a finished paper. Watermarks or certain decorative structures in tissue papers are examples thereof. It is possible for a multiplicity of structures to be transferred to the fibrous web produced by way of such signs or structures in the foam layer, in particular by way of structures embossed in the foam layer. The structures in the fibrous web can project as raised structures, depending on the use of such a clothing.

A particularly advantageous use of a clothing according to the invention can be the use as a forming belt in the form of a machine for producing a paper web, a cardboard web, or a tissue web. The forming belt herein can be embodied as a continuous belt, for example, or else also as a clothing that is capable of being sewn.

In terms of the method, the object is achieved by a method for producing a clothing, in particular a clothing according to the invention, said method comprising the following steps:
a) providing a basic structure;
b) providing a further structure;
c) connecting the at least one further structure to the basic structure.

The method according to the invention is characterized in that the further structure is composed of or comprises a layer of polymer foam, and the method moreover comprises the following step:
d) compacting the layer of polymer foam under the influence of pressure and/or temperature.

The method step of compacting permits a multiplicity of properties of the layer of polymer foam in the production of the clothing to be adapted in a targeted manner to the requirements which are set for the clothing when in use. In an exemplary and not exhaustive manner, adapting the thickness of the layer of polymer foam and varying the anisotropy of the pore structure are to be mentioned here. The extent of at least a large proportion of the pores in the thickness direction can be reduced in size by compacting. An adaptation of the permeability of the layer of polymer foam can also be achieved on account thereof. A great bandwidth of specially adapted clothings can thus be produced by using commercially available standardized polymer foams, for example.

A further effect that can be achieved by compacting is a further improvement of the surface properties of the paper-contacting side of the clothing. It can thus be achieved that the material of the foam layer is fused on the surface on account of the influence of pressure and/or temperature. On account thereof, mutually contacting foam elements or bars, respectively, can be interconnected in a materially integral manner. Surfaces thus created can have an enhanced mechanical stability or abrasion resistance, respectively.

Preferred embodiments of the method are described in the dependent claims.

The compacting can be performed, for example, by compression at an elevated temperature followed by cooling. Cooling can be performed while maintaining the compacting pressure. However, the latter can also be partially or entirely dispensed with, or cooling can be performed at a reduced pressure (<90% of the compacting pressure, in particular <75% of the compacting pressure), respectively. Suitable devices for the implementation of compressing can be represented by so-called double-belt presses.

Advantageous temperatures for compacting may differ in the case of dissimilar applications and materials. In the case of preferred applications such as, polyurethane soft foams, for example, the required temperatures can be in the range between 150° C. and 200° C.

In particular when compacting is performed after the foam layer has been connected to the basic structure, there is a further advantageous possibility for compacting in that the clothing is run through a calender. The calender herein can have a roller nip wherein at least one roller is heated. That roller that comes in contact with the foam layer is often advantageously heated herein.

In advantageous embodiments of the method it can be provided that compacting is performed in one method step. In further advantageous embodiments it can also be provided that compacting is performed in a plurality of method steps.

It can thus be provided, for example, that the connecting of the at least one further structure to the basic structure is performed by means of welding, in particular laser transmission welding, flame laminating, or adhesive bonding.

In advantageous embodiments of the method, the compacting of the layer of polymer foam can be performed before or after connecting the at least one further structure to the basic structure. Compacting can be particularly advantageously performed both prior to connecting as well as after connecting.

Suitable, commercially available polymer foams such as, for example polyurethane soft foams, usually have thicknesses in the range from 2.5 mm to 9 mm, in particular between 3.5 mm and 7 mm.

In particularly preferred embodiments of the method the thickness of the foam layer after compacting is less than 30%, preferably less than 25%, particularly preferably less than 20%, of the initial thickness.

In terms of the determination of the thickness of the foams it is to be noted that said thickness, as opposed to the determination of the compression capability and elasticity of the clothing, is established in a pressure-free manner, thus without applying a basic stress of 6 kPa. If the layer of polymer foam is compacted after fastening to the basic structure, it can arise that parts of the foam layer on account thereof invade depressions of the support structure, or are pushed thereinto, respectively. This proportion is not used for determining the thickness of the foam layer.

In further advantageous embodiments the polymer foam prior to compacting can have a pore density between 30 and 80 pores per inch (PPI), preferably between 45 and 60 PPI.

PPI herein is a unit of measure used internationally for the permeability of porous materials and describes a linear structural density.

In further advantageous embodiments the polymer foam prior to compacting has a raw density between 15 and 60 kg/m$^3$, preferably between 25 and 35 kg/m$^3$.

In one further advantageous embodiment it can be provided that the method comprises a step in which a structure is transferred onto, in particular embossed into, the layer of polymer foam. In one particularly preferable embodiment, transferring the structure can be performed simultaneously with compacting the layer of polymer foam.

In one most particularly preferred embodiment it can be provided that a hot roller which is brought into contact with the layer of polymer foam is used in compacting. This roller can advantageously be specified such that a structure that is to be transferred onto the foam is incorporated as a negative in the roller surface. This structure can be from a heat-conducting material (metal, for example) or from a non-heat-conducting material such as a polymer (silicone, for example). The structure is then embossed into the surface of the foam layer during compacting. Alternatively or additionally, it is also possible for structural elements to be incorporated, for example engraved, in the roller surface. These structural elements remain as raised elements in the foam layer after compacting.

By means of transferring structures to the foam layer in such a manner, by contrast to classic watermarks, for example, it is possible for the clothing to continue to have a relevant permeability at the locations of the structural features. Depending on the design embodiment of the structure, said relevant permeability can optionally be somewhat higher or lower than the permeability of the remaining clothing. This can be advantageous inter alia when the structures, or the structural elements, respectively, cover a significant part, in particular more than 10%, of the surface of the material web. Dewatering of the material web is also performed through these regions of the clothing. The dewatering of the material web is thus substantially more uniform as compared to classic watermarks for forming screens in which no dewatering usually takes place in regions having a structure applied thereto.

BRIEF DESCRIPTION OF THE SEVERAL VIEWS OF THE DRAWING

The invention will be explained in more detail hereunder by means of schematic figures in which.

DESCRIPTION OF THE INVENTION

Figure 1:
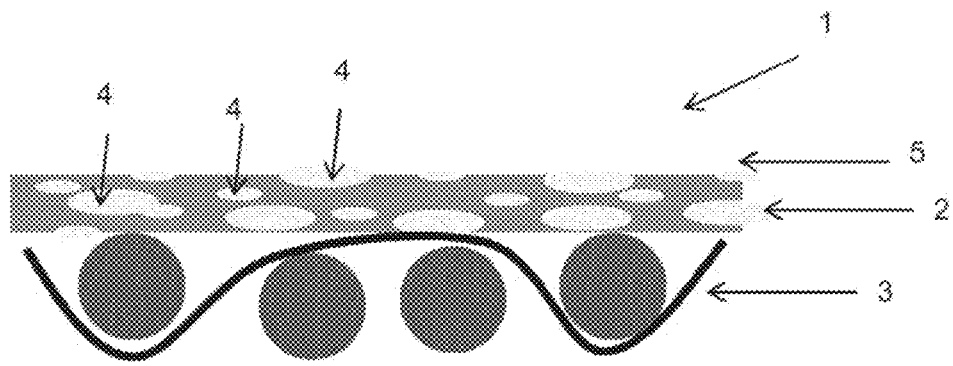
FIGS. 1 and 2 show two embodiments of a clothing according to the invention.

The construction of a clothing 1 such as can be used as a forming belt 1, for example, is shown in a very schematic manner in FIG. 1. The clothing in the embodiment shown here comprises a woven fabric 3 which makes available the basic structure 3. A layer of polymer foam 2 is fastened to this basic structure 3. Said layer of polymer foam 2 can be composed of a polyurethane soft foam, for example. Said layer of polymer foam 2 also makes available the paper-contacting side 5 of the clothing. The pores 4 of the layer of polymer foam 2 in the clothing shown in FIG. 1 are anisotropic. This can be implemented, for example, in that a standard polymer foam which usually has isotropic pores has been compacted by way of a compacting step by means of pressure and/or temperature. On account thereof, apart from the thickness of the foam layer 2, also the shape of the pores 4 is changed. Said pores 4 are deformed in the thickness direction.

A potential production method for a clothing as shown in FIG. 1 is to be explained by way of an exemplary embodiment. A woven basic structure 3 is first made available in the example. Said woven basic structure 3 is woven from polyester filaments. Moreover, a foam in the form of a reticulated polyurethane soft foam is made available. Said reticulated polyurethane soft foam in the example has a thickness of 4 mm and a pore density of 45 PPI. Laser transmission welding represents a suitable method for connecting the layers of polymer foam 2 to the basic structure 3. A NIR laser having a wavelength of 940 nm is used in the example. Said NIR laser was pressed fitted at a joining pressure of approx. 20 N/cm. In laser transmission welding it is particularly advantageous for the polymer foam 2 to fully or partially absorb the laser light while the base structure 3 is fully or largely transparent to the laser light. This was achieved in the example by dying the polymer foam, an anthracite-colored foam being used herein. On account of the choice of a basic woven fabric of polyester, the laser light was able to first penetrate the basic structure 3 and said laser light was thereafter absorbed by the polymer foam. The heat required for welding was thus generated at the connection location between the basic structure 3 and the foam layer 2. This is a principle that is usual in laser transmission welding.

The laminate thus connected was then compacted under pressure at a temperature of approx. 190° C. The resulting clothing 1 had a permeability of 400 cfm at a thickness of 1.07 mm (measured at 6 kPa pressure). The proportion of the basic structure 3 in the example herein was 0.49 mm, the proportion of the foam layer 2 was 0.58 mm. At an initial thickness of the foam of 4 mm, said foam by the method was compacted to 14.5% of the initial thickness thereof.

At a pressure of 50 kPa, the laminate 1 was compressed to 0.91 mm, wherein the thickness of the foam layer 2 was 0.42 mm. At this pressure, the foam layer was thus further compressed by 27%. When releasing the pressure to 6 kPa, the foam layer expanded again to the initial thickness thereof (within the range of measuring accuracy).

In experiments of the applicant, a surprisingly higher dry content than in comparable screens without a foam layer 2 could also be achieved in a paper by way of the clothing described in the example. The reduced tendency toward marking could also be demonstrated herein.

Figure 2:
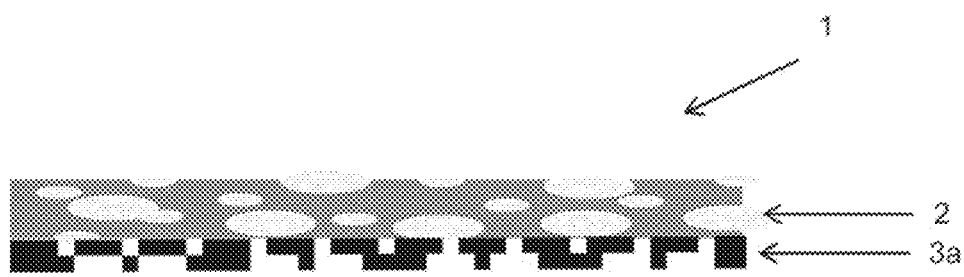

FIG. 2 shows a schematic illustration of a clothing according to the invention in which the basic structure 3a is made available by a permeable film structure 3a. The film structure 3a herein can be a single perforated film. Alternatively, such a film structure per se can be constructed from a laminate of different films. Connecting the foam layer 2 and the basic structure 3a herein can be performed by welding or adhesive bonding, for example.

Figure 3:
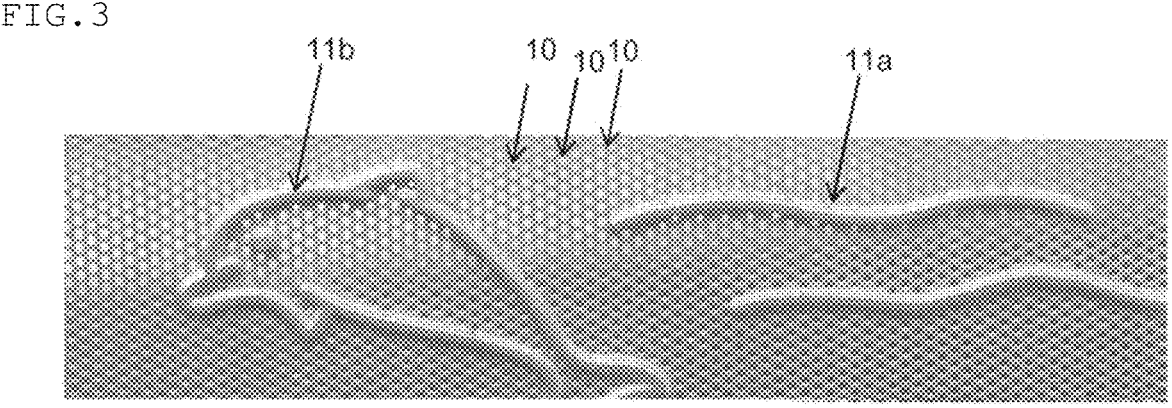
FIG. 3 shows a fragment from the surface of a roller for transferring a structure onto a foam layer.

FIG. 3 shows a fragment of the surface of a roller for transferring a structure onto a foam layer. The roller in the example shown here has raised structural elements 11a, 11b which are embossed into a layer of polymer foam 2. Moreover, the fragment in FIG. 3 has a multiplicity of structural elements 10 which are embodied as round depressions in the roller surface. These structural elements are transferred as raised elements onto the foam layer 2.

In the case of the example shown in FIG. 3, both the roller surface as well as the raised structural elements 11a, 11b are embodied from metal. However, it can also be provided that said raised structural elements 11a, 11b are fully or partially composed of a non-heat-conducting material, for example of a polymer. While transferring the structural elements 10, 11a, 11b to the polymer foam 2 in principle can be performed in a separate operating step prior to or subsequent to the production of the clothing, the transfer is however often advantageously performed conjointly with compacting the foam layer. In this way, one process step in the production of the clothing can be dispensed with. Moreover, no additional devices are required for this transfer.

The invention claimed is:

1. A clothing or a forming belt for a machine for producing or processing a fibrous web, the clothing comprising:
   a paper side;
   a backing side;
   a basic structure; and
   at least one further structure formed of or including a layer of polymer foam providing said paper side, said layer of polymer foam configured to be compressed in a thickness direction by more than 10% in a compressive stressing of the clothing of 50 kPa as compared to an initial thickness under a compressive stressing of 6 kPa.

2. The clothing according to claim 1, wherein said layer of polymer foam has an anisotropic pore structure.

3. The clothing according to claim 1, wherein said layer of polymer foam is configured to expand back to substantially the initial thickness in a subsequent compressive de-stressing of the clothing from 50 kPa to 6 kPa.

4. The clothing according to claim 1, wherein said layer of polymer foam is formed of or includes an elastomer or a polyurethane.

5. The clothing according to claim 1, wherein said layer of polymer foam has an area weight of between 60 g/m$^2$ and 300 g/m$^2$.

6. The clothing according to claim 1, wherein said layer of polymer foam has a raw density of between 100 kg/m$^3$ and 700 kg/m$^3$.

7. The clothing according to claim 1, wherein the clothing has a permeability of between 100 CFM and 700 CFM.

8. The clothing according to claim 1, wherein the clothing has a permeability of between 200 CFM and 600 CFM.

9. The clothing according to claim 1, which further comprises a structure or a uniform structure incorporated in said layer of polymer foam.

10. The clothing according to claim 1, wherein said layer of polymer foam is disposed on only one side of said basic structure.

11. A clothing or a forming belt for a machine for producing or processing a fibrous web, the clothing comprising:
    a paper side;
    a backing side;
    a basic structure; and
    at least one further structure formed of or including a layer of polymer foam providing said paper side, said layer of polymer foam configured to be compressed in a thickness direction by more than 15% in a compressive stressing of the clothing of 50 kPa as compared to an initial thickness under a compressive stressing of 6 kPa.

12. The clothing according to claim 11, wherein said layer of polymer foam is configured to expand back to substantially the initial thickness in a subsequent compressive de-stressing of the clothing from 50 kPa to 6 kPa.

13. A clothing or a forming belt for a machine for producing or processing a fibrous web, the clothing comprising:
a paper side;
a backing side;
a basic structure; and
at least one further structure formed of or including a layer of polymer foam providing said paper side, said layer of polymer foam configured to be compressed in a thickness direction by more than 20% in a compressive stressing of the clothing of 50 kPa as compared to an initial thickness under a compressive stressing of 6 kPa.

14. The clothing according to claim 13, wherein said layer of polymer foam is configured to expand back to substantially the initial thickness in a subsequent compressive de-stressing of the clothing from 50 kPa to 6 kPa.

15. A clothing or a forming belt for a machine for producing or processing a fibrous web, the clothing comprising:
a paper side;
a backing side;
a basic structure;
at least one further structure formed of or including a layer of polymer foam providing said paper side;
said layer of polymer foam having a raw density of between 100 kg/m$^3$ and 700 kg/m$^3$; and
said layer of polymer foam being configured to be compressed in a thickness direction by more than 10% in a compressive stressing of the clothing of 50 kPa as compared to an initial thickness under a compressive stressing of 6 kPa.

16. The clothing according to claim 15, wherein said layer of polymer foam is configured to be compressed in a thickness direction by more than 15% in a compressive stressing of the clothing of 50 kPa as compared to an initial thickness under a compressive stressing of 6 kPa.

17. The clothing according to claim 15, wherein said layer of polymer foam is configured to be compressed in a thickness direction by more than 20% in a compressive stressing of the clothing of 50 kPa as compared to an initial thickness under a compressive stressing of 6 kPa.

* * * * *